United States Patent [19]

Laskody

[11] 4,217,756
[45] Aug. 19, 1980

[54] VORTEX MIXERS FOR REDUCING THE NOISE EMITTED BY JET ENGINES

[75] Inventor: Jerome R. Laskody, Carnation, Wash.

[73] Assignee: Boeing Commercial Airplane Company, Seattle, Wash.

[21] Appl. No.: 864,564

[22] Filed: Dec. 27, 1977

[51] Int. Cl.² ............................................ F02K 3/02
[52] U.S. Cl. ..................................... 60/262; 181/219
[58] Field of Search .................... 60/262; 415/119; 181/213, 219, 220; 239/265.17, 127.3

[56] References Cited

U.S. PATENT DOCUMENTS

| | | | |
|---|---|---|---|
| 2,443,250 | 6/1948 | Johnson | 60/262 |
| 2,880,574 | 4/1959 | Howald | 60/262 |
| 2,935,847 | 5/1960 | Markowski | 60/39.72 R |
| 3,100,627 | 8/1963 | Wilde | 60/262 |
| 3,647,020 | 3/1972 | MacDonald | 239/127.3 |
| 3,655,009 | 4/1972 | Hilbig | 239/127.3 |
| 3,737,005 | 6/1973 | Tontini | 239/127.3 |
| 3,776,363 | 12/1973 | Kuethe | 415/119 |

Primary Examiner—Douglas Hart
Attorney, Agent, or Firm—Ronald E. Suter; Bernard A. Donahue

[57] ABSTRACT

Apparatus for internally mixing fan exhaust with primary exhaust forward of the nozzle exit plane of a turbofan engine having an outer engine cowling, a splitter wall structure and a tail plug disposed in mid engine upstream of the nozzle exit plane is provided by a plurality of struts disposed radially between the engine tail plug and the outer engine cowling upstream of the nozzle exit plane and a plurality of vortex generating means disposed on the struts for generating vorticies across the entire engine exhaust area.

8 Claims, 4 Drawing Figures

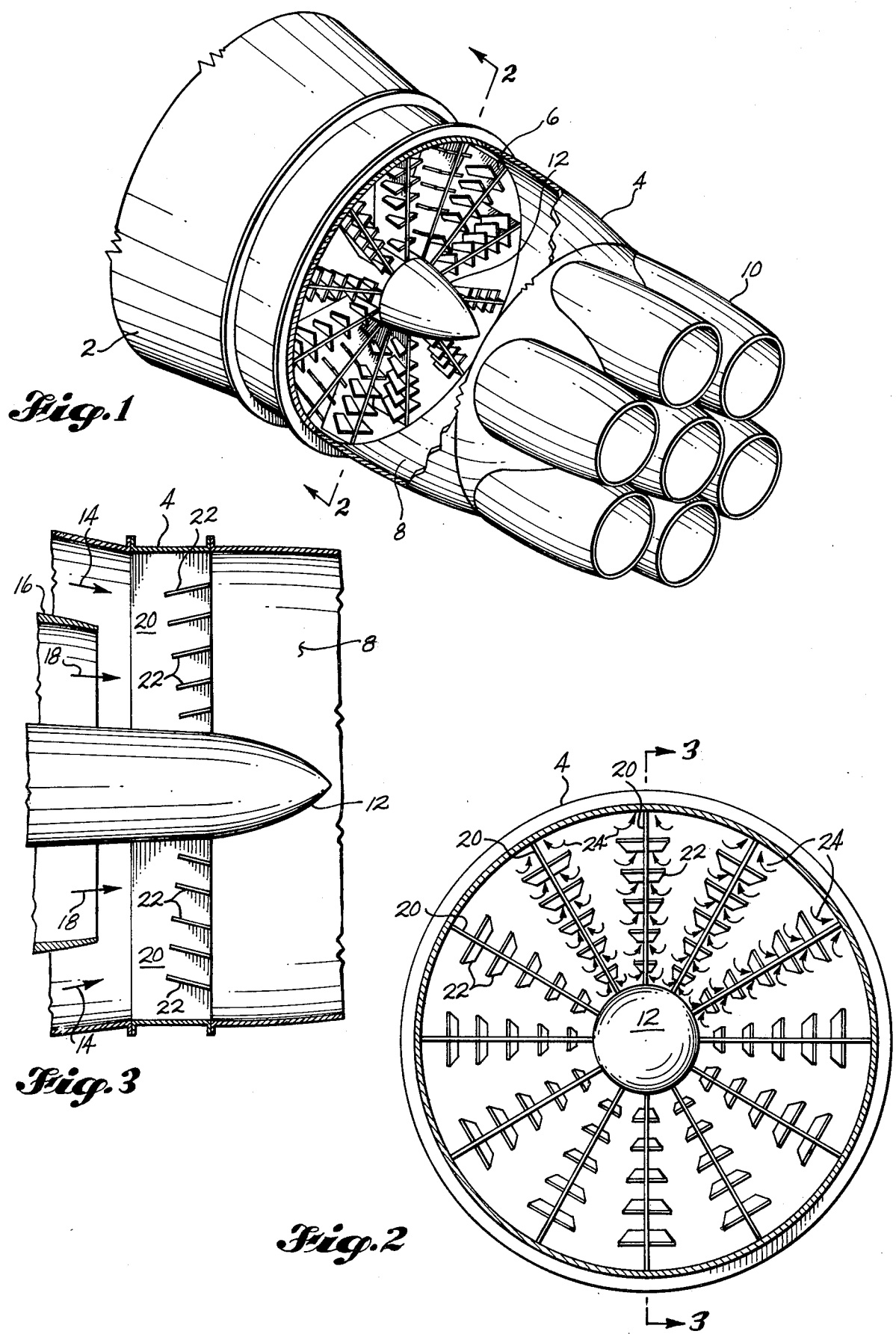

VORTEX MIXERS FOR REDUCING THE NOISE EMITTED BY JET ENGINES

BACKGROUND OF THE INVENTION

1. Field of the Invention

This invention relates to vortex generators and particularly to an apparatus of vortex generators which generate vorticies across the exhaust ducting of a jet engine, which vorticies cause a mixing of the hot primary fluids with the cooler fan air passing through the engine, thereby resulting in a lowering of the noise emitted by the engine exhaust.

2. Description of the Prior Art

Present low bypass turbofan jet engines produce large amounts of exhaust noise at high power engine conditions. Noise caused by jet engine exhaust is generally considered to be proportional to at least the sixth power of the velocity of the exhaust. In a conventional turbofan engine the velocity of the hot centrally located primary flow exiting from the turbine is much higher than that of the surrounding cooler flow from the fan. In some engines, the flows are initially separated by a wall or splitter, but are allowed to mix in a tailpipe section prior to passing through the nozzle exit plane. In certain turbofan engine installations, such as the Pratt and Whitney Aircraft JT8D Engine installed in a Boeing Company 727 airplane, the tailpipe length is not sufficient to allow satisfactory mixing. The higher velocity of the primary gases exiting the nozzle creates very high levels of jet noise in mixing with the ambient air.

Devices for mixing these two flows within the engine are known. Mixing devices consisting of convoluted ducting, commonly referred to as "lobe type" mixers have been successful in achieving noise reduction, but have been practically unsuccessful because of their relatively high cost (approximately 10 times the cost of noise reduction apparatus according to the present invention) and weight. Further, the lobe type mixer is not adaptable to all engine/airplane combinations such as the above-mentioned JT8D engine/727 airplane combination because the mixer interferes with the thrust reverser of the engine.

Single vortex generators have been proposed as a low cost, light weight solution to provide increased mixing of the two flows without the problems attendant to the lobe type mixer by Birch, et al, in the U.S. Pat. application Ser. No. 754,046, filed Dec. 23, 1976, which is a continuation-in-part of U.S. Pat. application Ser. No. 563,548, filed Mar. 31, 1975, both applications being assigned to the assignee of the present application. However, in the Birch, et al device, most mixing of the fan flow with the primary exhaust flow occurs near the middle region of the flow field by the single vortex generators which are mounted on the splitter. The present invention has been found to provide mixing across the entire engine exhaust area and thus to provide significantly increased noise reduction from the engine exhaust.

SUMMARY OF THE INVENTION

The object of the present invention is to provide apparatus for reducing the noise emitted by the exhaust of a turbofan engine by providing mixing of the fan air with the primary exhaust flow across the entire engine exhaust area.

In accordance with the present invention an apparatus for internal mixing of fan exhaust flow with primary exhaust flow forward of the nozzle exit plane of a turbofan engine having an outer engine cowling, a splitter wall structure and a tail plug disposed in mid engine upstream of the nozzle exit plane is provided by a plurality of struts disposed radially between the engine tail plug and the outer engine cowling upstream of the nozzle exit plane of the engine, and a plurality of vortex generating means disposed on the struts for generating vorticies across the entire engine exhaust area.

In further accord with the present invention, twelve struts are radially disposed symmetrically about the engine tail plug and the vortex generating means are disposed on each of two sides of the struts for generating counter-rotating vorticies.

The foregoing and other objects, features and advantages of the present invention will become more apparent in light of the following detailed description of a preferred embodiment thereof, as illustrated in the accompanying drawings.

DESCRIPTION OF THE DRAWINGS

FIG. 1 is a partial schematic drawing of a turbofan engine showing an exemplary embodiment of a vortex generating apparatus in accordance with the present invention.

FIG. 2 is a partial end view taken along line 2—2 of FIG. 1.

FIG. 3 is a partial sectioned elevation taken along line 3—3 of FIG. 2.

DESCRIPTION OF THE PREFERRED EMBODIMENT

Figure 4:
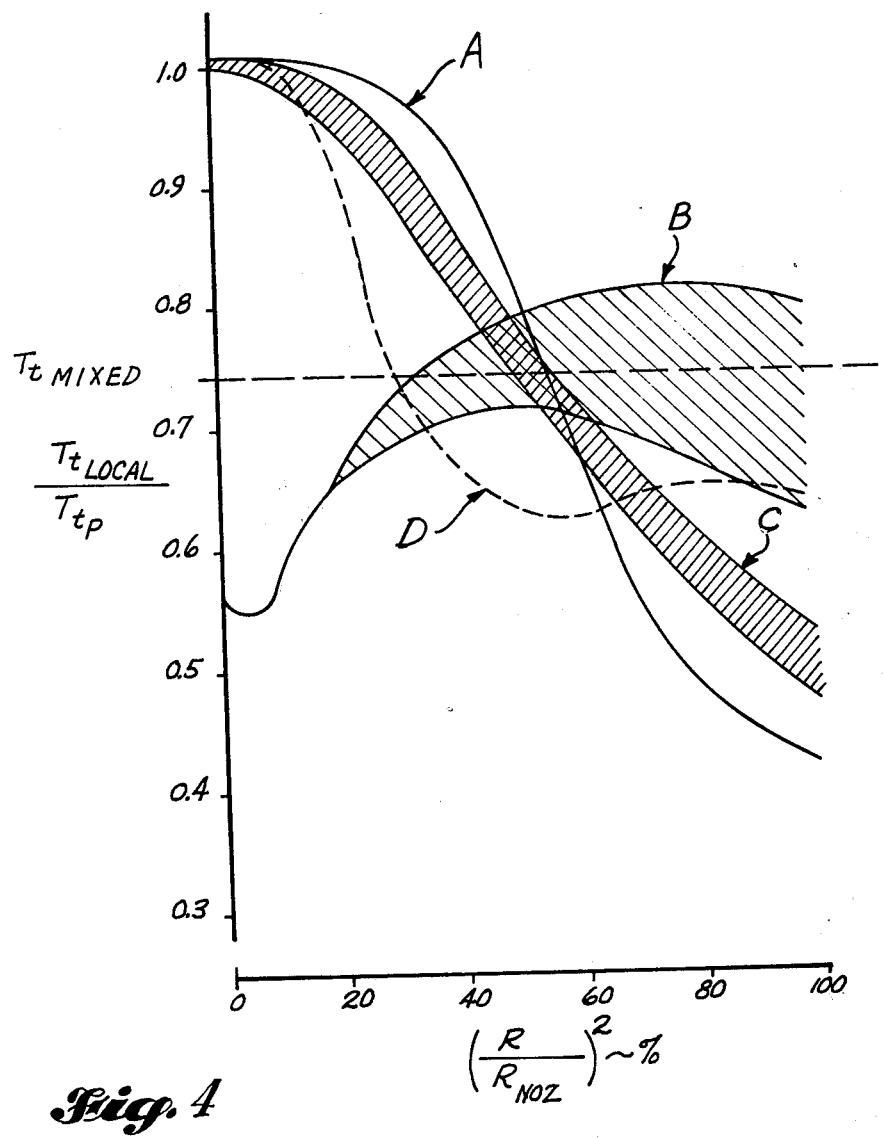
FIG. 4 is a graphical illustration of the area weighted total temperature profile at the nozzle exit plane of a JT8D engine/727 airplane exhaust system showing the temperature profiles resulting from the use of various mixing devices in the engine/airplane combination.

Referring to FIG. 1, there is shown the aft section of a turbofan engine 2. An outer engine cowling 4 encloses the vortex generating apparatus 6 according to the present invention. The thrust reverser which normally occupies the space 8 aft of the vortex generating apparatus 6 is not shown for clarity. A seven tube nozzle 10 may be disposed on the aft end of the engine cowling. A tail plug 12 is disposed in mid engine upstream of the nozzle exit plane of the engine.

As shown best in FIG. 3, the cooler fan exhaust, shown by arrows 14, flows between the outer engine cowling 4 and the splitter structure 16. The hot primary exhaust, shown by arrows 18, flows within the splitter structure 16.

The vortex generating apparatus 6 according to the present invention is disposed upstream of the nozzle exit plane of the engine. The apparatus comprises a plurality of struts 20 disposed radially between the engine tail plug 12 and the outer engine cowling 4. A plurality of vortex generating means 22 are disposed on the struts 20. A configuration of twelve struts 20 with vortex generating means 22 disposed on each of two sides of the struts 20 for generating counter-rotating vortices, as depicted by the numeral 24 in FIG. 2, has been found to be particularly efficient in mixing the fan exhaust flow with the primary exhaust flow as shown in FIG. 4.

FIG. 4 is a graphical illustration of the area weighted total temperature profiles at the nozzle exit plane of a 727 airplane/JT8D engine exhaust system for different flow mixing apparatuses which have been obtained by plotting the ratio of the temperature $T_{tLOCAL}$ of the exhaust flow measured at a particular point in the nozzle exit plane cross-section to the maximum temperature $T_{tp}$ in the exhaust flow (measured in the primary flow exhaust) against the square of the ratio of the radius R at the point where the temperature $T_{tLOCAL}$ has been measured to the radius $R_{NOZ}$ of the engine exit nozzle. Curve A represents the temperature profile for a configuration in which a splitter structure 16 is present, but no other mixing apparatus is installed. Curve B represents the temperature profile for a twelve lobe mixer which provides the best mixing but, as mentioned above, is very expensive, results in a large weight penalty and has the further disadvantage of being incompatible with a 727 airplane/JT8D engine combination.

Curve C represents the mixing obtained by the single vortex generator taught in the Birch, et al application discussed hereinbefore. Curve D shows the temperature profile obtained by utilization of the apparatus according to the present invention. As can be seen from FIG. 4, Curve D, representing the present invention, achieves a higher percentage of mixing than all systems except for the twelve lobe mixer. The noise reduction improvement obtained by the use of the present invention ranges from 38 percent to 240 percent when compared with the Birch, et al apparatus.

Other vortex generator configurations were also tested. They were as follows: an apparatus with eight struts having vortex generating means disposed on each of two sides of the struts for generating counter-rotating vortices; an apparatus with eight struts having vortex generating means disposed on each of two sides of the struts, the vortex generating means having twice the plan-form area as the immediately above-mentioned apparatus; and an apparatus with twelve struts having vortex generating means disposed on each of two sides of the struts for generating co-rotating vortices which produces a single swirl cell per strut. While these devices provide more mixing than single splitter mounted vortex generators, it appears that the preferred embodiment results in a higher percentage of mixing and lower performance loss.

There has thus been described a preferred embodiment of an apparatus for internally mixing fan exhaust flow with primary exhaust flow of a turbofan engine upstream of the nozzle exit plane by creating vortices across the entire engine exhaust area. While a particular configuration of struts and vortex generating means has been shown, it will be understood by those skilled in the art that the benefits of the present invention may be derived in many configurations and are not limited to the one shown in the preferred embodiment. Therefore, it should be understood by those skilled in the art that various changes and omissions in the form and detail thereof may be made therein without departing from the spirit and scope of the invention which is to be limited only as set forth in the following claims.

What is claimed is:

1. In a turbofan engine having an annular fan fluid flow exhaust passageway located between an outer engine cowling and a splitter wall structure, said splitter wall structure terminating at a distance upstream of the nozzle exit plane of said engine, an annular primary fluid flow exhaust passageway located inside of said splitter wall structure, and a tail plug disposed in mid engine upstream of the nozzle exit plane and extending downstream past the end of said splitter wall structure, apparatus for internal mixing of fan exhaust flow with primary exhaust flow upstream of the nozzle exit plane of said engine and downstream of the end of said splitter wall structure, comprising:
   a plurality of struts disposed radially between the engine tail plug and the outer engine cowling upstream of the nozzle exit plane; and
   a plurality of vortex generating means disposed at radially spaced locations on each of said struts for generating vortices across the entire engine exhaust area to promote mixing of said fan and primary exhaust flows to reduce noise.

2. Apparatus for internal mixing of fan exhaust with primary exhaust in a turbofan engine as defined in claim 1, wherein twelve struts are radially disposed symmetrically about the engine tail plug.

3. Apparatus for internal mixing of fan exhaust with primary exhaust in a turbofan engine as defined in claim 2, wherein said vortex generating means are disposed on each of two sides of said struts for generating a pair of counter-rotating vortices at each said radially spaced location along each of said struts.

4. Apparatus for internal mixing of fan exhaust with primary exhaust in a turbofan engine as defined in claim 1, wherein eight struts are radially disposed symmetrically about the engine tail plug.

5. Apparatus for internal mixing of fan exhaust with primary exhaust in a turbofan engine as defined in claim 4, wherein said vortex generating means are disposed on each of two sides of said struts for generating a pair of counter-rotating vortices at each said radially spaced location along each of said struts, one vortex of each pair disposed on each side of said strut.

6. Apparatus for internal mixing of fan exhaust with primary exhaust in a turbofan engine as defined in claim 2 or 4, wherein said vortex generating means are disposed on each of two sides of said struts for generating a pair of co-rotating vortices at each said radially spaced location along each of said struts.

7. Apparatus for internal mixing of fan exhaust with primary exhaust in a turbofan engine as claimed in claim 1, wherein said vortex generating means are positioned at a location spaced downstream from the end of said splitter structure.

8. Apparatus for internal mixing of fan exhaust with primary exhaust in a turbofan engine as claimed in claim 7, wherein said engine cowling has a conical shape of decreasing diameter for a distance downstream of the end of said splitter wall structure.

* * * * *